(12) United States Patent
Kim et al.

(10) Patent No.: US 8,189,140 B2
(45) Date of Patent: May 29, 2012

(54) LIQUID CRYSTAL DISPLAY DEVICE HAVING COMMON ELECTRODE BEING FORMED ON COLOR FILTER PATTERNS

(75) Inventors: Chul Ho Kim, Incheon (KR); Jung Jae Lee, Gwacheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/265,272

(22) Filed: Nov. 3, 2005

(65) Prior Publication Data

US 2006/0092353 A1 May 4, 2006

(30) Foreign Application Priority Data

Nov. 4, 2004 (KR) .................. 10-2004-0089308

(51) Int. Cl.
 *G02F 1/1335* (2006.01)
 *G02F 1/1333* (2006.01)
(52) U.S. Cl. ...................... 349/106; 349/110
(58) Field of Classification Search .............. 349/110, 349/111, 141, 106
 See application file for complete search history.

(56) References Cited

U.S. PATENT DOCUMENTS

| | | | | |
|---|---|---|---|---|
| 5,736,278 A | * | 4/1998 | Nakazawa et al. | 430/7 |
| 5,880,799 A | * | 3/1999 | Inoue et al. | 349/110 |
| 5,948,577 A | * | 9/1999 | Nakazawa et al. | 430/7 |
| 6,399,257 B1 | * | 6/2002 | Shirota et al. | 430/7 |
| 6,657,695 B1 | * | 12/2003 | Song et al. | 349/143 |
| 2002/0105612 A1 | * | 8/2002 | Ohta et al. | 349/141 |
| 2003/0118921 A1 | * | 6/2003 | Chen et al. | 430/7 |
| 2003/0118922 A1 | * | 6/2003 | Hayashi et al. | 430/7 |
| 2003/0169388 A1 | * | 9/2003 | Agano et al. | 349/112 |
| 2004/0125273 A1 | * | 7/2004 | Nam et al. | 349/78 |
| 2004/0189895 A1 | * | 9/2004 | Chen et al. | 349/106 |
| 2004/0234872 A1 | * | 11/2004 | Horiguchi | 430/7 |
| 2006/0124168 A1 | * | 6/2006 | Momii et al. | 136/251 |

FOREIGN PATENT DOCUMENTS

| | | |
|---|---|---|
| DE | 69526192 | 8/2002 |
| EP | 0738905 | 10/1996 |
| JP | 7-181473 A | 7/1995 |
| JP | 8-5813 A | 1/1996 |
| JP | 8-146211 A | 6/1996 |
| JP | 2000-28817 A | 1/2000 |

* cited by examiner

*Primary Examiner* — Lauren Nguyen (74) *Attorney, Agent, or Firm* — Birch, Stewart, Kolasch & Birch, LLP (57) ABSTRACT

An LCD device and a method for fabricating the same is described, in which each of light-shielding patterns has the uniform thickness to prevent the step coverage from being generated in color filter patterns by the light-shielding patterns. The LCD device includes a substrate with pixel and light shielding regions definede, a transparent material layer formed on the substrate corresponding to the pixel regions, a light-shielding layer formed on the substrate corresponding to the light shielding regions, and a color filter layer on the transparent material layer.

6 Claims, 7 Drawing Sheets

LIQUID CRYSTAL DISPLAY DEVICE HAVING COMMON ELECTRODE BEING FORMED ON COLOR FILTER PATTERNS

This application claims the benefit of Korean Patent Application No. 10-2004-0089308 filed in Korea on Nov. 4, 2004, which is hereby incorporated by reference as if fully set forth herein.

BACKGROUND OF THE INVENTION

1. Field of the Invention

The present invention relates to a liquid crystal display (LCD) device, and more particularly, to a color filter substrate of an LCD device.

2. Discussion of the Related Art

Among various ultra-thin flat type display devices, which include a display screen having the thickness of several centimeters (cm), a liquid crystal display (LCD) device attracts great attentions in that it has advantages such as low power consumption due to low driving voltage and portability. In this respect, the LCD device can be widely used for notebook computers, monitors, aircraft, and etc.

Generally, the LCD device includes a thin film transistor (TFT) substrate, a color filter substrate, and a liquid crystal layer. The TFT substrate is positioned opposite to the color filter substrate with a predetermined interval therebetween, and the liquid crystal layer is formed between the TFT substrate and the color filter substrate. In this state, the alignment of liquid crystal molecules of the liquid crystal layer changes based on an applied voltage, whereby the picture image is realized according to the control on transmissivity of light.

On the TFT substrate, a plurality of gate lines are arranged in a first direction at fixed intervals, a plurality of data lines are arranged in a second direction perpendicular to the gate lines also at fixed intervals, a plurality of pixel electrodes in respective pixel regions defined by the gate lines and the data lines in a matrix-type configuration, and a plurality of thin film transistors (TFTs) switchable in response to signals on the gate lines for transmission of signals on the data line to the pixel electrodes.

The color filter substrate has a light-shielding layer having light-shielding patterns for shielding light from regions other than the pixel regions, and a color filter layer having color filter patterns of red (R), green (G) and blue (B) corresponding to the respective pixel regions between each of the light-shielding patterns, for displaying the colors.

According to an operation mode of the LCD device, a common electrode or an overcoat layer may be additionally formed on the light-shielding layer and the color filter layer. For a TN (Twisted Nematic) mode LCD device, the common electrode is required. For an IPS (In-Plane Switching) mode LCD device, the overcoat layer is required. With the IPS mode LCD device, the common electrode is formed on the thin film transistor substrate.

Hereinafter, a related art color filter substrate will be described with reference to the accompanying drawings.

FIGS. 1A to 1E are cross sectional views of the process for fabricating a color filter substrate according to the related art.

Figure 1A:
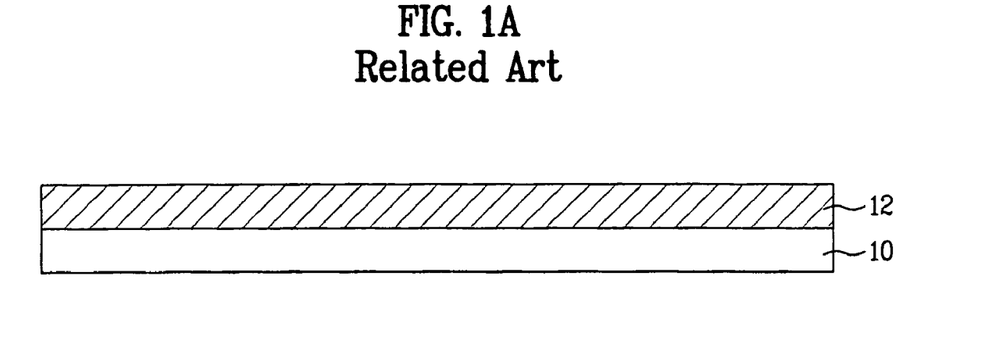
FIGS. 1A to 1E are cross sectional views of a process for fabricating a color filter substrate according to the related art.
Figure 1B:
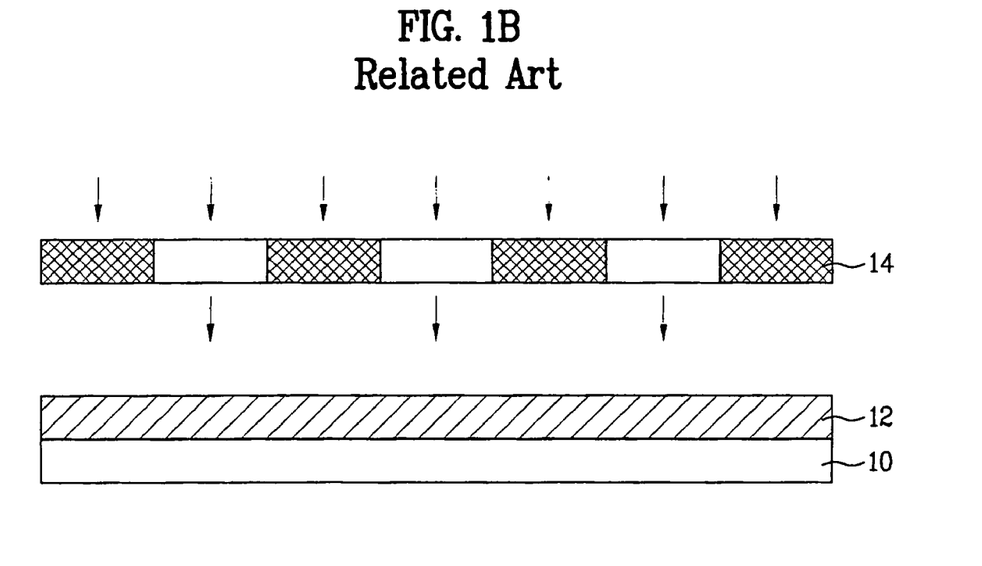
Figure 1C:
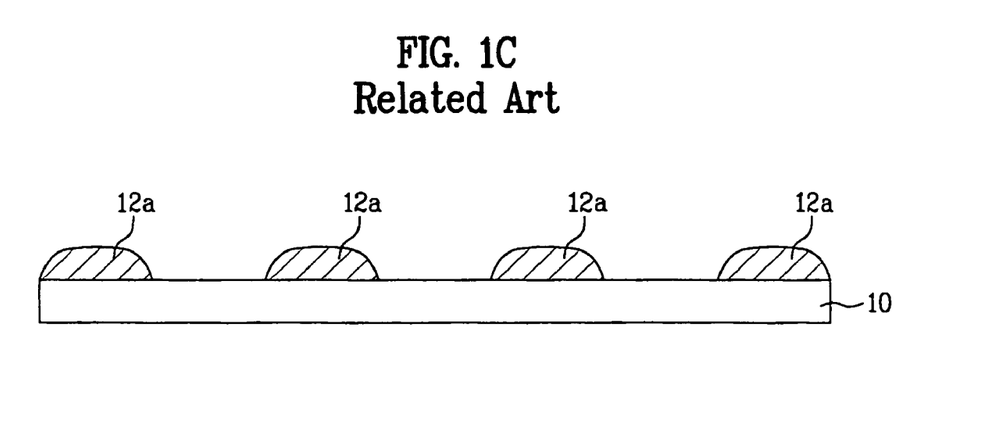
Figure 1D:
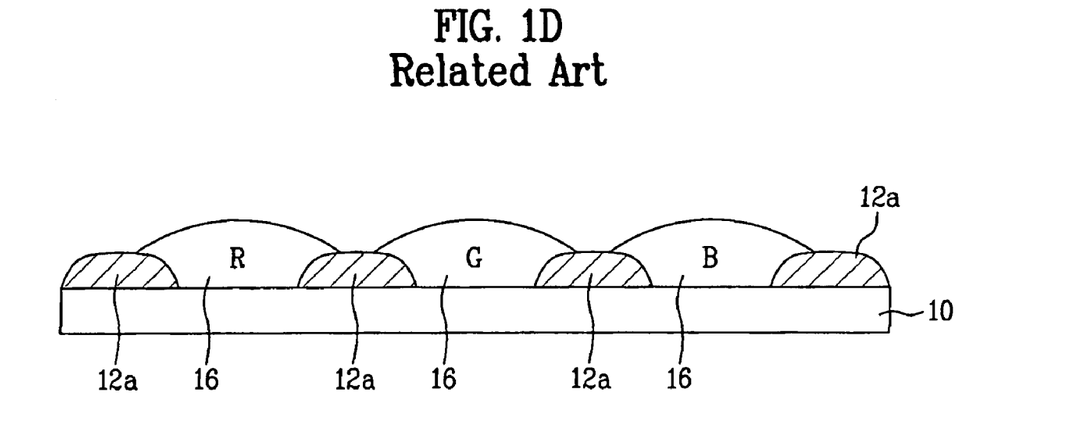
Figure 1E:
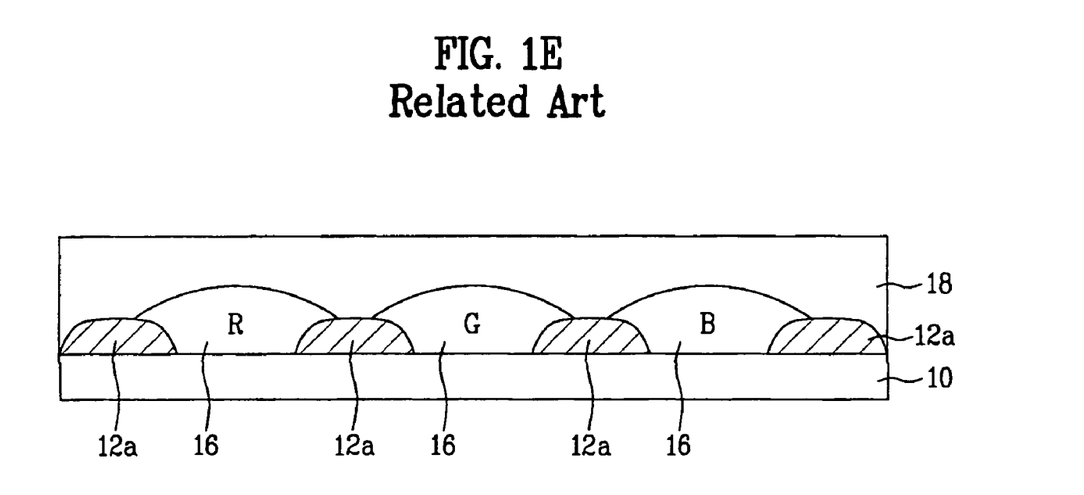

First, light-shielding patterns 12a are formed on a glass substrate 10 by photolithography (FIGS. 1A to 1C), and each of color filter patterns 16 of R, G and B is formed between the light-shielding patterns 12a by photolithography (FIG. 1D). Then, a common electrode or an overcoat layer 18 is formed on an entire surface of the glass substrate 10 (FIG. 1E).

The detailed process will be explained as follows.

As shown in FIG. 1A, a light-shielding material 12, an opaque photosensitive light-shielding material, is coated on the glass substrate 10.

Referring to FIG. 1B, a mask 14 of a desired predetermined pattern is positioned above the glass substrate 10 having the light-shielding material 12 and the light is irradiated thereon.

As shown in FIG. 1C, the light-shielding material 12 irradiated with the light is developed and cured, thereby forming the light-shielding patterns 12a.

As shown in FIG. 1D, each of the color filter patterns of R, G and B 16 is formed between the light-shielding patterns 12a. The color filter patterns 16 as well as the light-shielding patterns 12a are formed by photolithography.

Referring to FIG. 1E, the common electrode (in case of the TN mode LCD device) or the overcoat layer (in case of the IPS mode LCD device) 18 is formed on the color filter patterns 16, thereby completing the color filter substrate according to the related art.

However, the method for fabricating the color filter substrate according to the related art has the following disadvantages.

In the color filter substrate according to the related art, a step coverage is generated on both sides of each of the color filter patterns 16 due to the light-shielding patterns 12a, whereby it cause a deterioration of the picture quality.

Prior to forming the color filter patterns 16, the step coverage is formed due to the light-shielding patterns 12a. Thus, when the color filter patterns 16 are formed, it is difficult to use a relatively simple spinless coating method. Instead of the spinless coating method, a relatively complex photolithography process is used to form the color filter patterns 16.

Also, it is necessary for the light-shielding patterns 12a to be a predetermined thickness suitable to shield the light. If the photolithography process using opaque light-shielding material is performed, as shown in FIG. 1C, the entire thickness of each of the light-shielding patterns 12a is not uniform. That is, the ends of each of the light-shielding patterns 12a are relatively thinner than the central portion of each of the light-shielding patterns 12a. Accordingly, it is impossible to completely shield the light, thereby lowering the luminance.

SUMMARY OF THE INVENTION

Accordingly, embodiments of the present invention are directed to an LCD device and a method for fabricating the same that substantially obviate one or more problems due to limitations and disadvantages of the related art.

In an aspect of the present invention, an LCD device and a method for fabricating the same are provided in which each of light-shielding patterns has uniform thickness, which prevents the step coverage from being generated in color filter patterns by the light-shielding patterns.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device includes a substrate with pixel regions and light shielding regions; a transparent material layer formed on the substrate corresponding to the pixel regions; a light-shielding layer formed on the substrate corresponding to the light shielding regions and being adjacent to the transparent material layer; and a color filter layer on the transparent material layer.

The height of the transparent material layer is the same as the height of the light-shielding layer.

Also, the color filter layer overlaps with the predetermined portions of the light-shielding layer adjacent to the transparent material layer.

In another aspect, an LCD device includes a first substrate with pixel regions and light shielding regions; a transparent material layer formed on the first substrate corresponding to the pixel regions; a light-shielding layer formed on the first substrate corresponding to the light shielding region adjacent to the transparent material layer; a color filter layer on the transparent material layer; a second substrate opposite to the first substrate with a predetermined interval therebetween, the second substrate having a thin film transistor and a pixel electrode; and a liquid crystal layer formed between the first and second substrates.

In another aspect, a method for fabricating an LCD device includes forming a transparent material layer on a substrate having pixel regions and light-shielding regions; selectively removing the transparent material layer from the light-shielding regions; forming a light-shielding layer on the substrate in the light-shielding regions from which the transparent material layer is removed; and forming a color filter layer on the transparent material layer.

In another aspect, a method for fabricating an LCD device includes forming a transparent material layer on a first substrate having pixel regions and light-shielding regions; selectively removing the transparent material layer from the light-shielding regions; forming a light-shielding layer on the first substrate of the light-shielding regions from which the transparent material layer is removed; forming a color filter layer on the transparent material layer; forming a thin film transistor array including a thin film transistor separated from the first substrate, the thin film transistor array including pixel electrodes on a second substrate; and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device and a method for fabricating the same according to an embodiment of the present invention will be described with reference to the accompanying drawings.

FIGS. 2A to 2G are cross sectional views of the process for fabricating a color filter substrate according to an embodiment of the present invention.

Figure 2A:
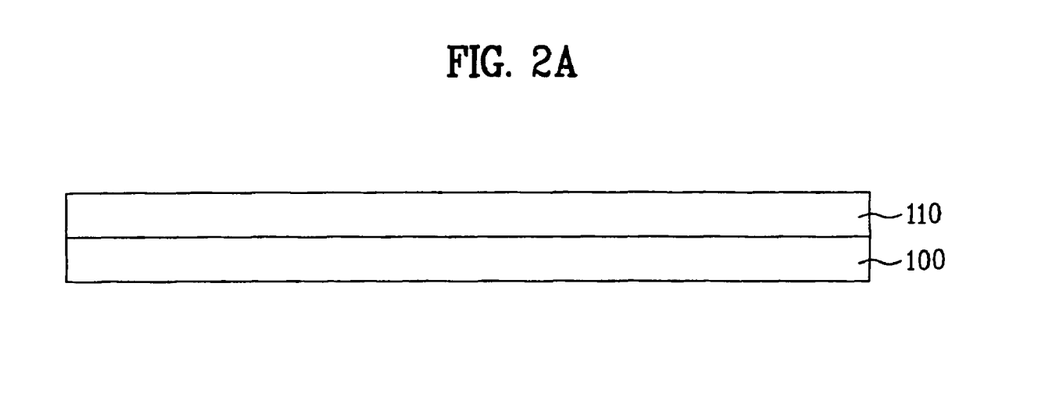
FIGS. 2A to 2G are cross sectional views of a process for fabricating a color filter substrate according to an embodiment of the present invention.

As shown in FIG. 2A, a transparent material layer 110 is coated on a substrate 100. The transparent material layer 110 may be formed from a transparent photosensitive resin. It is preferable to use an acrylic type resin as the transparent photosensitive resin, for example, acrylate, methacrylate, acrylamide, acrylonytrile, acrylic acid or methacryl.

Figure 2B:
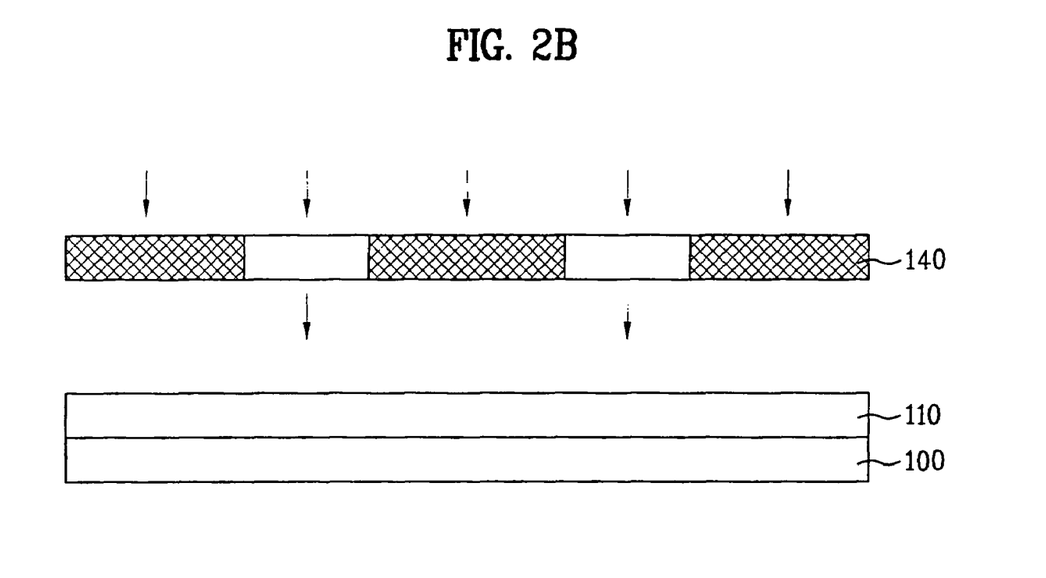

Referring to FIG. 2B, a mask 140 for defining the light-shielding regions is positioned above the substrate 100 coated with the transparent material layer 110, and the light is irradiated thereon.

Figure 2C:
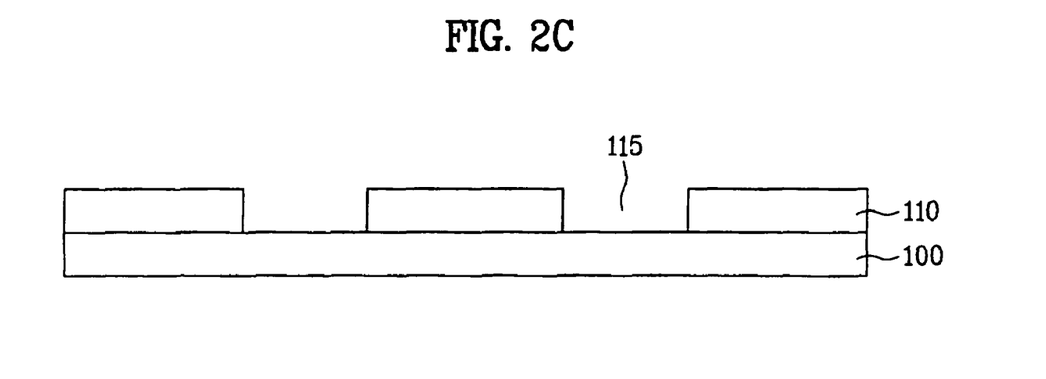

As shown in FIG. 2C, the transparent material layer 110, irradiated with the light, is developed and cured, whereby the transparent material layer 110 is removed from the light-shielding regions 115, thereby forming transparent material patterns on the pixel regions. If the transparent material layer 110 is formed of the acrylic type resin, it is possible to form the transparent material patterns with uniform thickness by development.

In the drawings, a positive type patterning is shown wherein the area that is irradiated with the light is removed by development. However, it is possible to apply a negative type patterning wherein the area that is not irradiated with the light is removed by development.

Figure 2D:
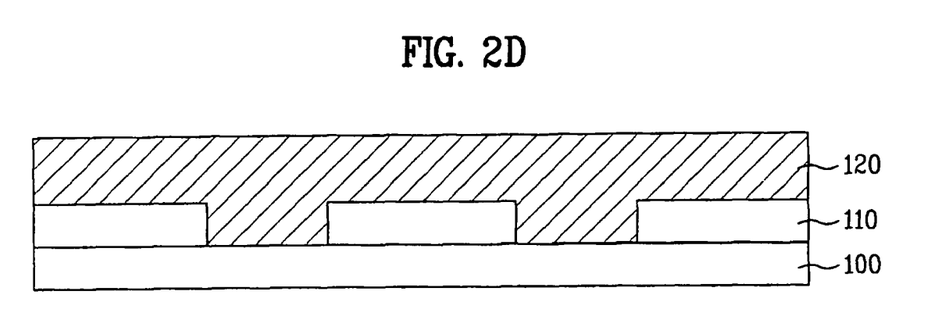

Referring to FIG. 2D, a light-shielding material 120 is coated on an entire surface of the substrate 100. The light-shielding material 120 is formed from an opaque resin. However, it is not limited to the opaque resin. As shown, a light-shielding layer is formed without photolithography, which makes it unnecessary to form the light-shielding layer from photosensitive resin. That is, the opaque resin is suitable for the light-shielding layer.

The light-shielding material 120 is coated on the entire surface of the substrate 100 using a spin coating method or a spinless coating method.

When the spin coating method is used, the light-shielding material 120 is positioned above the center of the substrate 100, and then the substrate 100 is rotated, whereby the light-shielding material 120 is coated on the entire surface of the substrate 100.

When the spinless coating method is used, the light-shielding material 120 is printed on the entire surface of the substrate 100 at once, which is suitable for the small-sized substrate. As an alternate way to use the spinless coating method, the light-shielding material 120 is printed in a scanning type from one edge to the other edge of the substrate 100, which is suitable for the large-sized substrate.

Figure 2E:
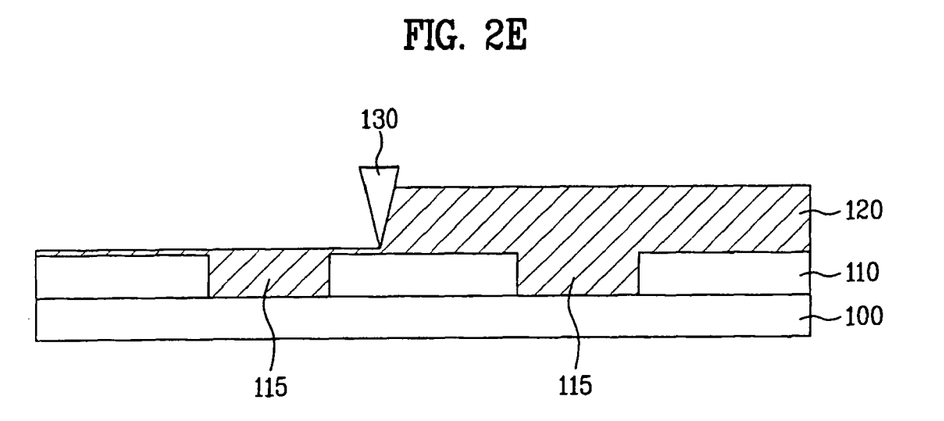

As shown in FIG. 2E, the light-shielding material 120, coated on portions other than the light-shielding regions 115, i.e above the pixel regions, may be removed mechanically with a squeeze or a structure 130 having a blade such as a doctor blade. Thus, the light-shielding material 120 is interposed between each of the transparent material patterns 110, thereby forming light-shielding patterns 120a. Thus, it is possible to prevent the unevenness on the entire surface of the substrate 100.

If the light-shielding material 120 is mechanically removed with the structure 130 having the blade, as shown in FIG. 2E, the light-shielding material 120 coated in the portions other than the light-shielding regions 115 may not be removed completely.

Figure 2F:
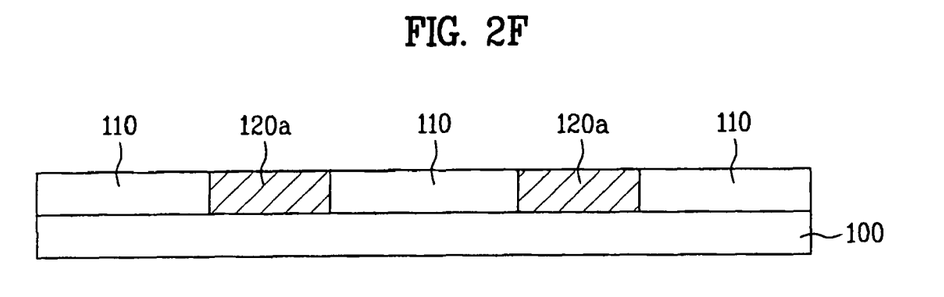

In this case, as shown in FIG. 2F, the light-shielding material remaining on the transparent material patterns 110 is removed by ashing, whereby each of the transparent material patterns 110 is same in height as each of the light-shielding patterns 120a, preferably. The ashing process is performed with oxygen plasma or light-irradiation lamp.

Figure 2G:
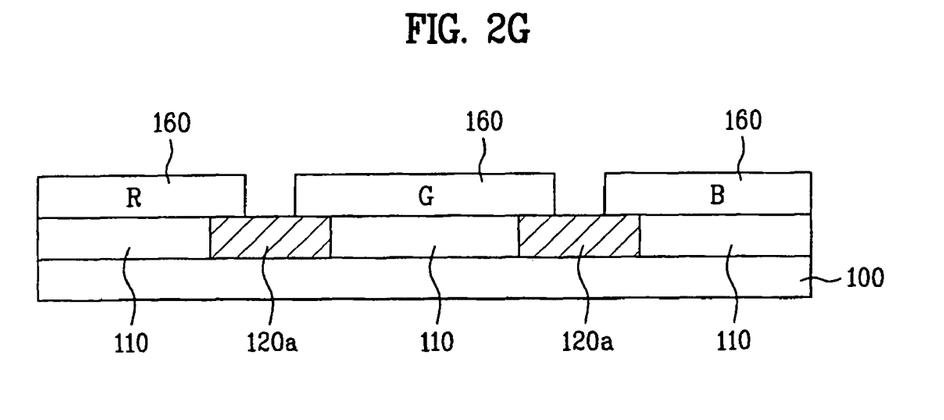

After that, as shown in FIG. 2G, each of color filter patterns 160 of red(R), green(G) and blue (B) is formed above the transparent material patterns 110, i.e. above the pixel regions and between the light-shielding patterns 120a, thereby completing the color filter substrate. In this case, each of the color filter patterns 160 may overlap with the transparent material pattern 110 between the light-shielding patterns 120a, and also may overlap with predetermined portions of the light-shielding patterns 120a adjacent to the transparent material pattern 110. Prior to forming the color filter patterns 160, the substrate has no step coverage (FIG. 2F). Thus, it is possible to use the relatively simple spinless coating method when forming the light-shielding patterns 120a.

As shown in FIG. 2G, the step coverage is not generated in the color filter substrate except the portion between the color filter patterns 160. Thus, it is unnecessary to provide an overcoat layer for removing the step coverage.

The structure of the color filter substrate fabricated by the method according to the present invention will be described as follows.

Figure 3:
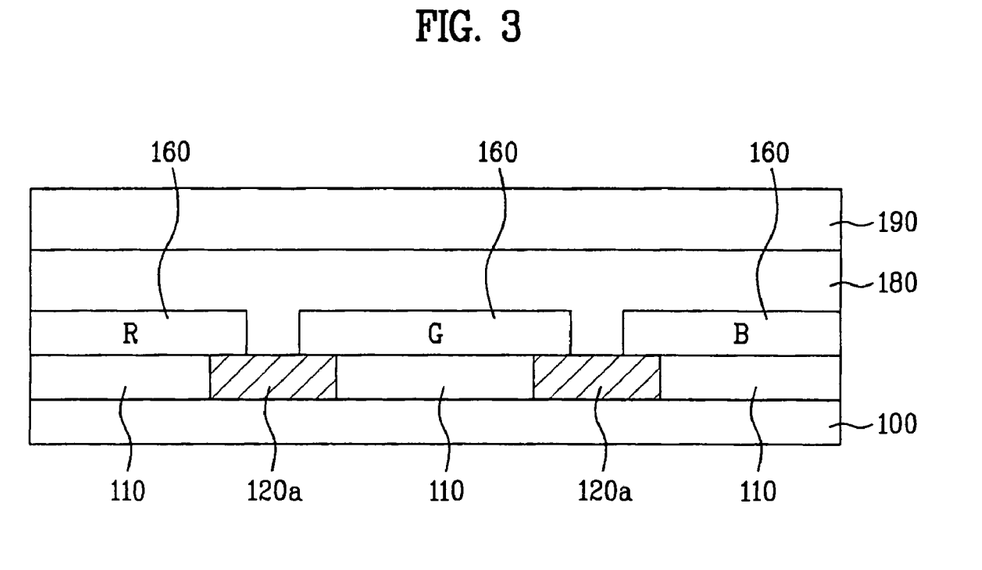
FIG. 3 is a cross sectional view of a color filter substrate according to an embodiment of the present invention.

FIG. 3 is a cross sectional view of the color filter substrate according to the preferred embodiment of the present invention.

As shown in FIG. 3, the color filter substrate according to the present invention includes the glass substrate 100, the transparent material layer having the transparent material patterns 110, the light-shielding layer having the light-shielding patterns 120a, and the color filter layer having the color filter patterns 160.

The transparent material patterns 110 are positioned correspondingly to the respective pixel regions on the glass substrate 100. Also, the light-shielding patterns 120a are positioned corresponding to the respective light shielding regions on the glass substrate 100, i.e. positions other than the pixel regions. In this case, the height of each transparent material pattern 110 is preferred to be the same as the height of each light-shielding pattern 120a. Then, each of the color filter patterns 160 of R, G and B is formed on the transparent material pattern 110, wherein each of the color filter patterns 160 overlaps with the predetermined portions of the light-shielding patterns 120a adjacent to the transparent material pattern 110.

Preferably, each of the transparent material patterns 110 has the same height as each of the light-shielding patterns 120a, so as to prevent the step coverage.

A method for fabricating the LCD device having the aforementioned color filter substrate will be described as follows.

Generally, a method for fabricating the LCD device is largely divided into three steps of forming a color filter substrate, forming a thin film transistor substrate, and forming a liquid crystal layer between the color filter substrate and the thin film transistor substrate.

The process of forming the color filter substrate is explained with reference to FIGS. 2A to 2G and FIG. 3. In this case, the process may be slightly changed according to the mode of LCD device.

That is, for the TN mode LCD device, a common electrode 180 is formed over the entire surface of the substrate including the color filter patterns 160 shown in FIG. 3. Then, an orientation layer 190 is formed on the common electrode 180, for the initial orientation of liquid crystal. The orientation layer 190 may be formed by rubbing or light-irradiation.

For the IPS mode LCD device, an overcoat layer 180 is formed over the entire surface of the substrate including the color filter patterns 160 shown in FIG. 3. Then, the orientation layer 190 is formed on the overcoat layer 180, for the initial orientation of liquid crystal. The orientation layer 190 may be formed by rubbing or light-irradiation.

Figure 4:
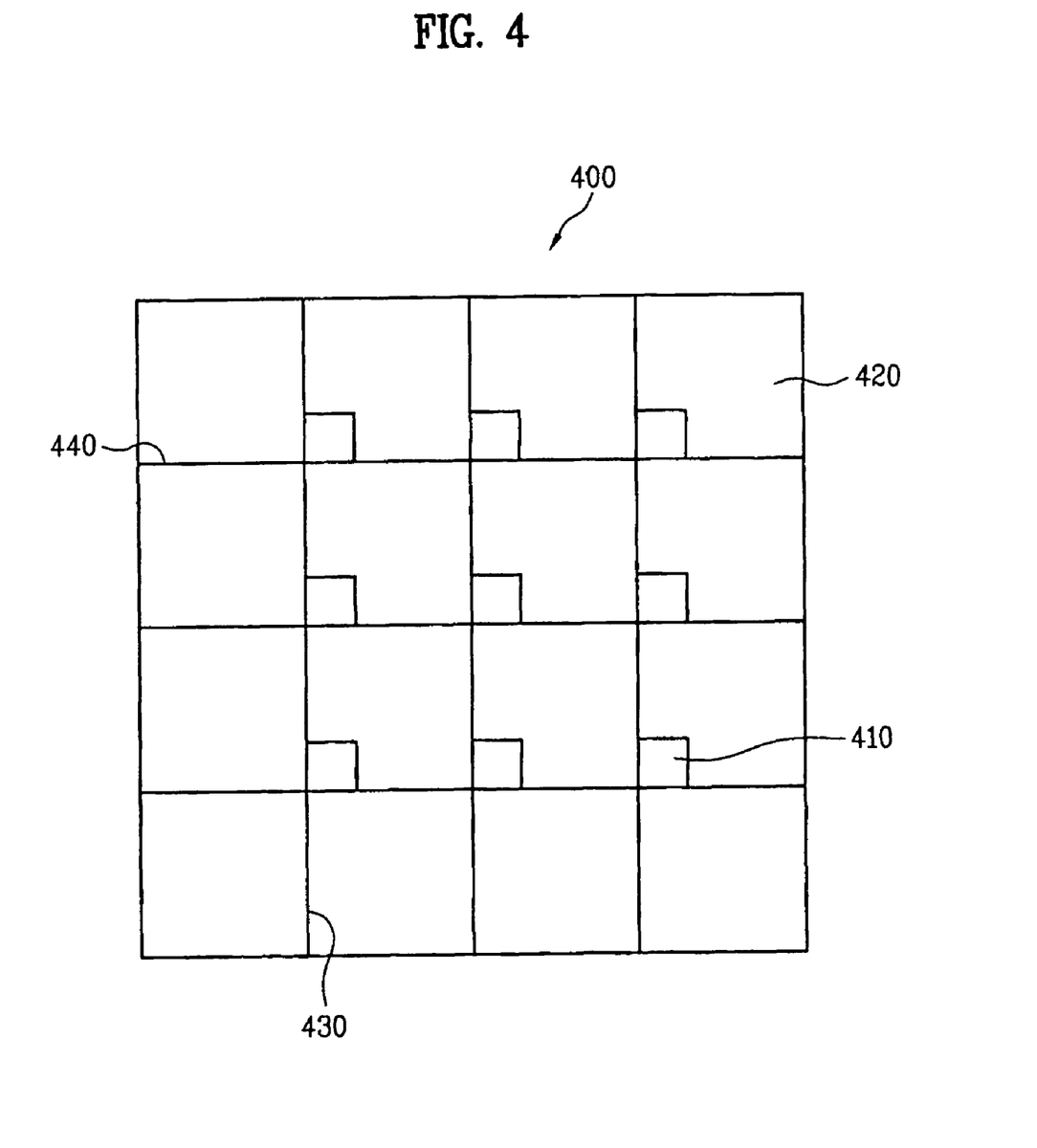
FIG. 4 is a top view of a substrate with thin film transistors and pixel electrodes.

The process of forming the thin film transistor substrate is explained as follows. As illustrated in FIG. 4, a thin film transistor substrate 400 includes a plurality of gate lines 440 crossing a plurality of data lines 430 in a matrix configuration. The crossing of the gate lines 440 and data lines 430 defines pixel regions 420 each having a TFT 410 and a pixel electrode coupled to that TFT.

First, for the TN mode LCD device, gate lines having gate electrodes are formed in one direction on the glass substrate. Then, a gate insulating layer is formed on the entire surface of the glass substrate. After that, a semiconductor layer is formed above the gate electrodes. In this state, data lines are formed perpendicularly to the gate lines, wherein source and drain electrodes are positioned at both sides of the semiconductor layer. As the gate lines are formed perpendicularly to the data lines, it is possible to define each pixel region. Also, thin film transistors are formed at crossing portions between the gate and data lines.

Subsequently, a passivation layer is formed on the entire surface of the glass substrate, and contact holes are formed in the drain electrodes. Also, a pixel electrode connected with the drain electrode is formed on the passivation layer of each pixel region.

For the IPS mode LCD device, gate lines having gate electrodes are formed in one direction on the glass substrate, and a gate insulating layer is formed on the entire surface of the glass substrate. Then, a semiconductor layer is formed above the gate electrodes. In this state, data lines are formed perpendicularly to the gate line, wherein source and drain electrodes are positioned at both sides of the semiconductor layer. As the gate lines are formed perpendicularly to the data lines, it is possible to define each pixel region. Also, thin film transistors are formed at crossing portions of the gate and data lines.

Subsequently, a passivation layer is formed on the entire surface of the glass substrate, and contact holes are formed in the drain electrodes. Also, a pixel electrode and a common electrode are formed in each pixel region. In this case, the pixel electrode is connected with each drain electrode, and the common electrode is positioned between the pixel electrodes.

Figure 5:
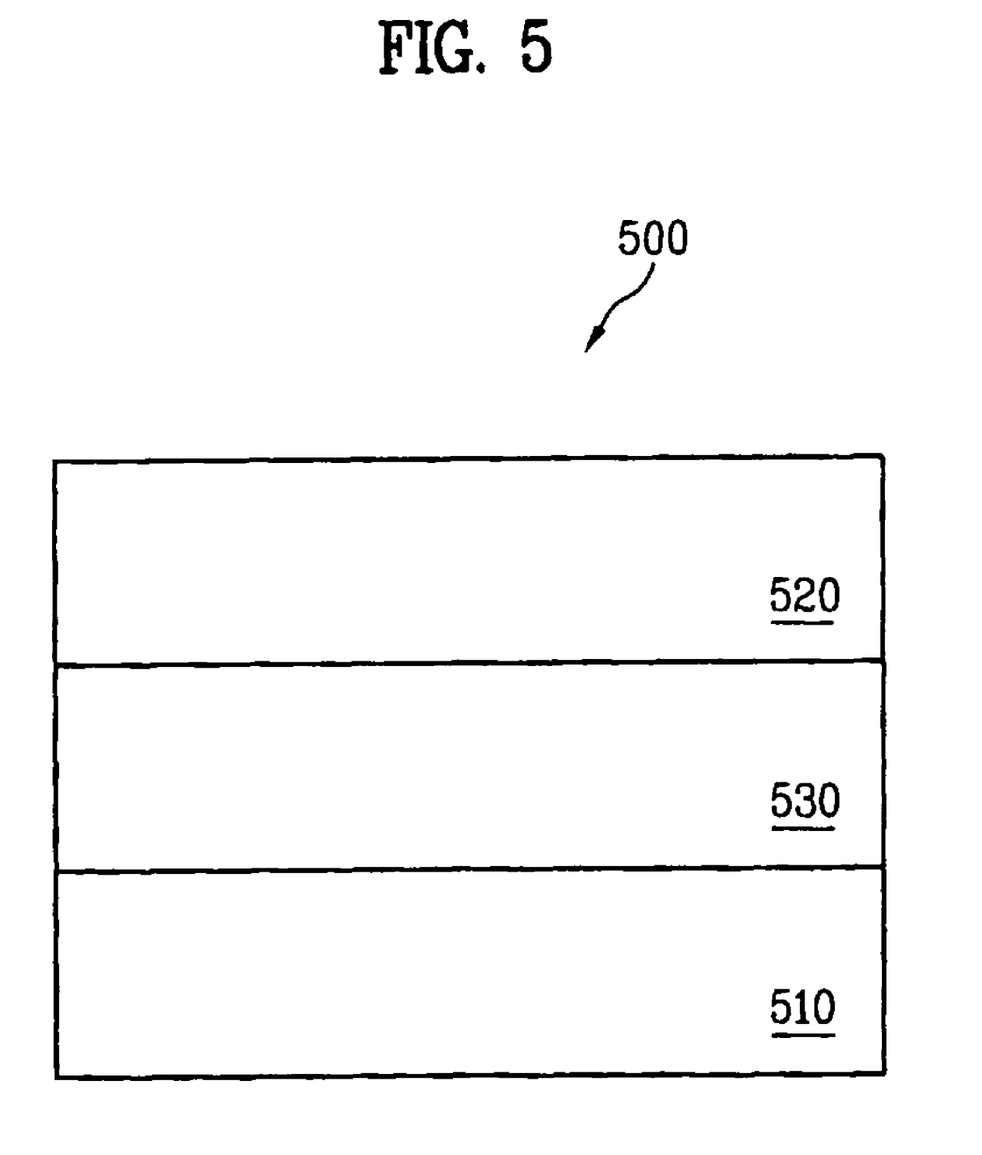
FIG. 5 is a cross sectional view of an LCD device according to an embodiment of the present invention.

The process of forming the liquid crystal layer between the color filter substrate and the thin film transistor substrate will be described as follows. FIG. 5 is a simplified cross sectional view of an LCD device. As illustrated, the LCD device 500 includes a color filter substrate 510 and a thin film transistor substrate 520 with a liquid crystal layer 530 therebetween.

The method for forming the liquid crystal layer is classified into the liquid crystal injection method and the liquid crystal dispensing method. In case of the liquid crystal injection method, after bonding the color filter substrate and the thin film transistor substrate to each other, the liquid crystal may be injected therebetween. In the liquid crystal dispensing method, after dispensing the liquid crystal on any one of the two substrates, the two substrates may be bonded to each other. In case of the large-sized LCD device, the liquid crystal injection method is not preferred in that it can cause decrease in productivity due to the long injection time. Accordingly, when forming the large-sized LCD device, it is preferable to apply the liquid crystal dispensing method.

The LCD device fabricated in the aforementioned method will be explained as follows.

The LCD device according to the embodiments of the present invention includes the color filter substrate, the thin film transistor substrate, and the liquid crystal layer between the color filter substrate and the thin film transistor substrate.

As shown in FIGS. 2A to 2G and FIG. 3, the explanation of the color filter substrate will be omitted. According to the mode of LCD device, the common electrode 180 may be additionally formed on the entire surface of the substrate including the color filter patterns 160 shown in FIG. 3 (TN mode), or the overcoat layer 180 may be additionally formed on the entire surface of the substrate including the color filter patterns 160 shown in FIG. 3 (IPS mode). Also, the orientation layer 190 may be additionally formed on the common electrode or the overcoat layer 180.

The TN mode LCD device includes the gate and data lines arranged perpendicular to each other so as to define the pixel regions on the glass substrate, the thin film transistors formed at the crossing portion of the gate and data lines, and the pixel electrode connected with the thin film transistor in the pixel region.

The IPS mode LCD device includes the gate and data lines arranged perpendicular to each other so as to define the pixel region on the glass substrate, the thin film transistors formed at the crossing portion of the gate and data lines, the pixel electrode connected with the thin film transistor in the pixel regions, and the common electrode formed between each of the pixel electrodes in the pixel region.

In addition, the orientation layer may be formed on the entire surface of the glass substrate.

Also, spacers may be formed between the two substrates, so as to maintain a cell gap therebetween.

As mentioned above, the LCD device and method for fabricating the same has the following advantages.

In the LCD device according to the embodiments of the present invention, the transparent material is patterned on the substrate, and the light-shielding regions are formed on the substrate. In this state, the light-shielding material is formed in correspondence with the light-shielding areas. Accordingly, it is possible to prevent the step coverage generated by the light-shielding patterns.

Prior to forming the color filter patterns, the substrate has no step coverage. Thus, it is possible to apply the relatively less complicated spinless coating method.

Also, the light-shielding patterns are controlled with the transparent material patterning process. Accordingly, it is possible to form each of the light-shielding patterns with uniform thickness, thereby obtaining the high luminance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device, comprising:
   a first substrate with defined pixel regions and light shielding regions;
   a transparent material layer formed on the first substrate corresponding to the pixel regions, wherein the transparent material layer is formed of methacryl;
   a light-shielding layer formed on the first substrate corresponding to the light shielding regions and being adjacent to the transparent material layer, the light shielding layer being formed at positions where portions of the transparent material layer has been removed;
   color filter patterns on the transparent material layer, ends of the color filter patterns overlapping the light-shielding layer; and
   a common electrode between the color filter patterns and on the color filter patterns, wherein the common electrode has a thinner thickness at an area on the color filter patterns than an area on the light-shielding layer between the color filter patterns,
   wherein the common electrode between the color filter patterns is directly in contact with the light-shielding layer,
   wherein heights of the transparent material layer and the light-shielding layer are substantially the same, and
   wherein the thickness of the common electrode varies only in a portion of the common electrode that is on and over the light shielding layer.

2. The LCD device of claim 1, wherein corresponding color filter patterns overlap with predetermined portions of the light-shielding layer adjacent to the transparent material layer.

3. The LCD device of claim 1, further comprising an orientation layer above the common electrode.

4. The LCD device of claim 1, further comprising an orientation layer on the common electrode.

5. The LCD device of claim 1, further comprising:
   a second substrate opposite to the first substrate with a predetermined interval therebetween, the second substrate having a thin film transistor and a pixel electrode; and
   a liquid crystal layer formed between the first and second substrates.

6. The LCD device of claim 5, wherein the common electrode is in parallel with the pixel electrode in each pixel region on the second substrate.

* * * * *